(12) United States Patent
Taguchi

(10) Patent No.: US 8,098,044 B2
(45) Date of Patent: Jan. 17, 2012

(54) VEHICLE CHARGING SYSTEM, VEHICLE CHARGING DEVICE AND ELECTRIC VEHICLE

(75) Inventor: Tomonari Taguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 499 days.

(21) Appl. No.: 12/310,476

(22) PCT Filed: Jul. 12, 2007

(86) PCT No.: PCT/JP2007/064303
§ 371 (c)(1),
(2), (4) Date: Feb. 26, 2009

(87) PCT Pub. No.: WO2008/041403
PCT Pub. Date: Apr. 10, 2008

(65) Prior Publication Data
US 2009/0256523 A1    Oct. 15, 2009

(30) Foreign Application Priority Data

Sep. 29, 2006    (JP) .................................. 2006-267718

(51) Int. Cl.
*H02J 7/00* (2006.01)
(52) U.S. Cl. ........................................ 320/109; 320/150
(58) Field of Classification Search .................. 320/109
See application file for complete search history.

(56) References Cited

U.S. PATENT DOCUMENTS

| | | | | |
|---|---|---|---|---|
| 5,306,999 A | * | 4/1994 | Hoffman | 320/109 |
| 5,341,083 A | * | 8/1994 | Klontz et al. | 320/109 |
| 5,461,298 A | * | 10/1995 | Lara et al. | 320/109 |
| 5,850,135 A | * | 12/1998 | Kuki et al. | 320/108 |
| 5,909,099 A | * | 6/1999 | Watanabe et al. | 320/108 |
| 6,014,597 A | * | 1/2000 | Kochanneck | 701/22 |
| 6,396,241 B1 | * | 5/2002 | Ramos et al. | 320/108 |
| 2001/0002786 A1 | * | 6/2001 | Najima | 320/108 |
| 2001/0003416 A1 | * | 6/2001 | Kajiura | 320/109 |
| 2003/0209375 A1 | * | 11/2003 | Suzuki et al. | 180/65.3 |
| 2005/0111167 A1 | * | 5/2005 | Yamaguchi et al. | 361/676 |
| 2007/0152640 A1 | * | 7/2007 | Sasaki et al. | 320/150 |
| 2008/0012535 A1 | * | 1/2008 | Takatsuji et al. | 320/150 |

FOREIGN PATENT DOCUMENTS

| | | |
|---|---|---|
| JP | A-08-037705 | 2/1996 |
| JP | A-10-223263 | 8/1998 |
| JP | A-2000-115915 | 4/2000 |
| JP | A-2000-228226 | 8/2000 |
| JP | A-2000-307596 | 11/2000 |
| JP | A-2002-008673 | 1/2002 |
| JP | A-2006-040625 | 2/2006 |

* cited by examiner

*Primary Examiner* — Arun Williams
(74) *Attorney, Agent, or Firm* — Oliff & Berridge, PLC

(57) ABSTRACT

When a connector portion is coupled, switching dampers block a vehicle compartment air intake duct and a vehicle compartment air discharge duct, respectively. By a blowing fan, the air-conditioned air supplied through an air-conditioned air supply conduit flows through an outside air intake duct, a power supply unit, an outside air discharge duct, and an air-conditioned air discharge conduit in turn, and cools a battery.

9 Claims, 6 Drawing Sheets

VEHICLE CHARGING SYSTEM, VEHICLE CHARGING DEVICE AND ELECTRIC VEHICLE

TECHNICAL FIELD

The present invention relates to a technique for charging a power storage device, mounted on an electric vehicle and configured to be rechargeable by an external power supply. More particularly, the present invention relates to a technique for managing temperature changes caused by charging.

BACKGROUND ART

So-called electric vehicles such as battery vehicles, hybrid vehicles or fuel cell vehicles are equipped with a power storage device made up of a secondary battery, a capacitor or the like, and generate a driving force from electric power stored in the power storage device through a motor.

A configuration has been proposed in which the power storage device mounted on these electric vehicles is charged by an external power supply such as a system power supply or a solar cell. As for a hybrid vehicle, in particular, if the cost of charging by an external power supply is lower than that of electric power generation at an internal combustion engine mounted on the hybrid vehicle, the overall driving cost can be suppressed by charging the power storage device by the external power supply.

When the power storage device is charged, temperature changes such as a resistive heat generation by a charging current, and an endothermic or exothermic reaction due to a change in entropy of the power storage device occur. Therefore, a configuration has been proposed in which, at the time of charging by the external power supply, a heat medium for managing such temperature changes is supplied to the electric vehicle in addition to the external power supply.

For example, Japanese Patent Laying-Open No. 08-037705 discloses an electrically-driven moving body housing a rechargeable battery and moving by electric power from the rechargeable battery, a pair of a connector for receiving charging electricity and a connector for receiving cold air as well as an exhaust hole being formed at a surface of the moving body, and a housing chamber for the rechargeable battery communicating with the connector for receiving cold air and the exhaust hole.

In the electric vehicles as described above, the power storage device is placed in a space for occupants, a luggage room or the like in most cases. Therefore, the provision of an exhaust hole as in the electrically-driven moving body disclosed in above-described Japanese Patent Laying-Open No. 08-037705 is not easy in terms of sound insulation and design. Thus, in a case where a heat medium (such as cold air) is supplied from outside the vehicle, the used heat medium that is to be discharged stays around the power storage device and the passenger comfort is degraded.

DISCLOSURE OF THE INVENTION

The present invention has been made to solve the above-described problems and an object thereof is to provide a vehicle charging system where the passenger comfort is ensured and a power storage device is charged by an external power supply while temperature changes caused by charging are managed, as well as a vehicle charging device and an electric vehicle directed to the vehicle charging system.

A vehicle charging system according to an aspect of the present invention includes an electric vehicle equipped with a power storage device that is configured to be rechargeable, and a vehicle charging device for charging the power storage device mounted on the electric vehicle by an external power supply. The vehicle charging device includes a connector portion coupled to the electric vehicle at the time of charging, an electric power supply line by which the external power supply and the electric vehicle are electrically connected through the connector portion at the time of charging, a heat medium supply conduit through which a heat medium for maintaining, at a prescribed temperature, a temperature change element whose temperature changes as a result of charging of the power storage device at the time of charging is supplied from outside the vehicle through the connector portion to the electric vehicle, and a heat medium discharge conduit through which the heat medium having been used to maintain a temperature of the temperature change element in the electric vehicle at the time of charging is discharged outside the vehicle through the connector portion.

According to this aspect, the heat medium for temperature management of the temperature change element is supplied to the electric vehicle in addition to the external power supply for charging the power storage device. Furthermore, the heat medium having been used to maintain the temperature of the temperature change element is discharged outside the vehicle through the heat medium discharge conduit. Therefore, retention of the used heat medium in a vehicle compartment space can be avoided. As a result, the passenger comfort is ensured and the power storage device can be charged by the external power supply while temperature changes caused by charging are managed.

Preferably, the connector portion includes a circulation mechanism for circulating the heat medium supplied through the heat medium supply conduit within the electric vehicle.

Preferably, the electric vehicle includes a heat medium path formed to be separated from a vehicle compartment space and configured such that the heat medium supplied through the heat medium supply conduit is guided to the heat medium discharge conduit, and the temperature change element is placed in the heat medium path such that heat exchange is performed between the heat medium and the temperature change element.

Preferably, the heat medium supply conduit is provided with air-conditioned air within an air-conditioned building as the heat medium, and the heat medium discharge conduit is configured such that the heat medium discharged from the electric vehicle is released outside the building.

More preferably, the electric vehicle further includes a vehicle compartment air path configured to communicate with the heat medium path, for taking in and delivering vehicle compartment air to the temperature change element, and an entry suppression mechanism for suppressing entry of the heat medium supplied through the heat medium path into the vehicle compartment space through the vehicle compartment air path.

More preferably, the heat medium supply conduit is configured such that a liquid medium having a prescribed temperature is further supplied as the heat medium in addition to the air-conditioned air, and the electric vehicle further includes a heat exchange mechanism by which heat exchange is performed between the air-conditioned air and the liquid medium before the air-conditioned air is used to maintain a temperature of the temperature change element.

A vehicle charging device according to another aspect of the present invention is a device for charging a power storage device, mounted on an electric vehicle and configured to be rechargeable by an external power supply. The vehicle charging device includes a connector portion coupled to the electric vehicle at the time of charging, an electric power supply line by which the external power supply and the electric vehicle are electrically connected through the connector portion at the time of charging, a heat medium supply conduit through which a heat medium for maintaining, at a prescribed temperature, a temperature change element whose temperature changes as a result of charging of the power storage device at the time of charging is supplied through the connector portion to the electric vehicle, and a heat medium discharge conduit through which the heat medium having been used to maintain a temperature of the temperature change element in the electric vehicle at the time of charging is discharged outside the vehicle through the connector portion.

According to this aspect, the heat medium for temperature management of the temperature change element can be supplied in addition to the external power supply for charging the power storage device. Furthermore, the heat medium having been used to maintain the temperature of the temperature change element is discharged outside the vehicle through the heat medium discharge conduit. Therefore, retention of the used heat medium in a vehicle compartment space can be avoided. As a result, the passenger comfort is ensured and the power storage device can be charged by the external power supply while temperature changes caused by charging are managed.

Preferably, the connector portion includes a circulation mechanism for circulating the heat medium supplied through the heat medium supply conduit within the electric vehicle.

Preferably, the heat medium supply conduit is provided with air-conditioned air within an air-conditioned building as the heat medium, and the heat medium discharge conduit is configured such that the heat medium discharged from the electric vehicle is released outside the building.

An electric vehicle according to still another aspect of the present invention is a vehicle equipped with a power storage device that is configured to be rechargeable and configured such that the power storage device can be charged by an external power supply. The electric vehicle is configured to be capable of being coupled to a connector portion through which the external power supply is supplied at the time of charging. The connector portion has a supply opening through which a heat medium is supplied to the electric vehicle at the time of charging and a discharge opening through which the heat medium discharged from the electric vehicle at the time of charging is received formed in a coupled surface to the electric vehicle. The electric vehicle includes a heat medium path formed to be separated from a vehicle compartment space and configured such that the heat medium supplied from the supply opening of the connector portion is guided to the discharge opening of the connector portion. A temperature change element is placed in the heat medium path such that heat exchange is performed between the heat medium and the temperature change element whose temperature changes as a result of charging of the power storage device at the time of charging.

According to this aspect, the external power supply is supplied through the connector portion and the heat medium is supplied through the same connector portion. The supplied heat medium passes through the heat medium path formed to be separated from the vehicle compartment space, and heat exchange is performed between the temperature change element and the heat medium. And then, the heat medium is discharged outside the vehicle through the discharge opening in the connector. Therefore, retention of the heat medium having been used to maintain the temperature of the temperature change element in the vehicle compartment space can be avoided. As a result, the passenger comfort is ensured and the power storage device can be charged by the external power supply while temperature changes caused by charging are managed.

Preferably, the electric vehicle further includes a vehicle compartment air path configured to communicate with the heat medium path, for taking in and delivering vehicle compartment air to the temperature change element, and an entry suppression mechanism for suppressing entry of the heat medium supplied through the heat medium path into the vehicle compartment space through the vehicle compartment air path.

According to the present invention, the passenger comfort is ensured and the power storage device can be charged by the external power supply while temperature changes caused by charging are managed.

BEST MODES FOR CARRYING OUT THE INVENTION

Figure 1:
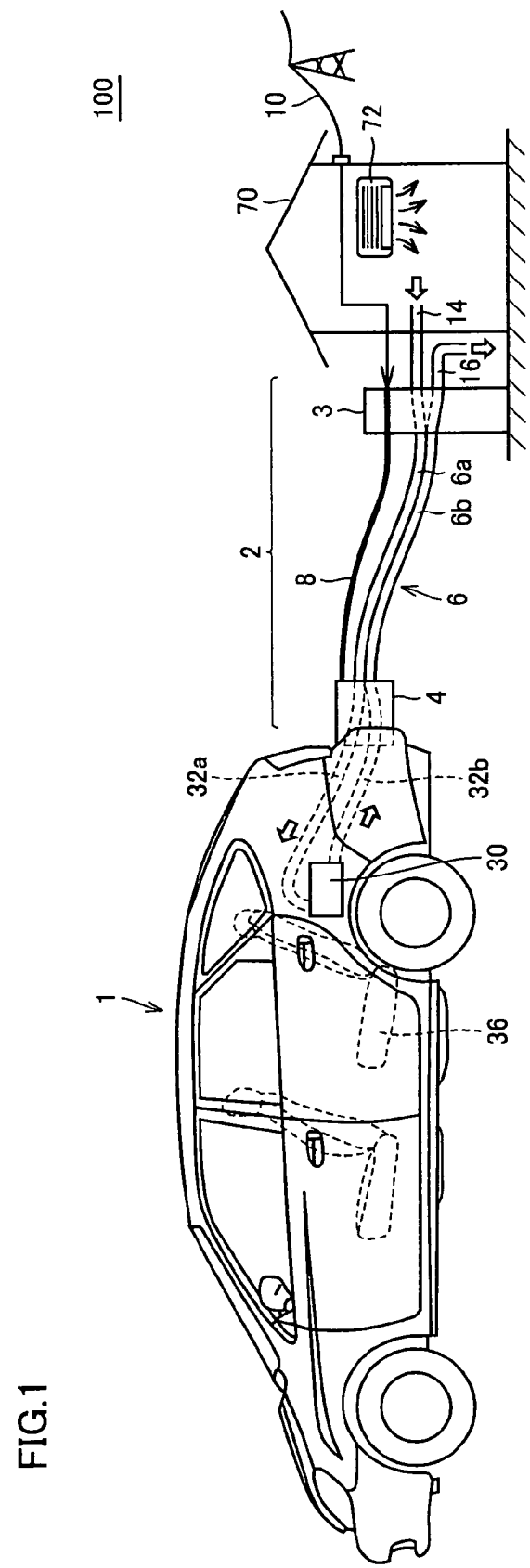
FIG. 1 is a schematic diagram of a vehicle charging system according to an embodiment of the present invention.

The embodiments of the present invention will be described in detail with reference to the drawings. The same or corresponding portions in the drawings are represented by the same reference characters, and the description thereof will not be repeated.

Referring to FIG. 1, a vehicle charging system 100 according to an embodiment of the present invention includes an electric vehicle 1 and a vehicle charging device 2.

Electric vehicle 1 is a hybrid vehicle by way of example and is equipped with a power supply unit 30. Power supply unit 30 is mainly a unit for supplying electric power to a motor that drives electric vehicle 1, and is configured to include a power storage device configured to be rechargeable as well as accessory electrical equipment. The power storage device is not limited to a secondary battery, but may be a fuel cell, a capacitor or the like. In a case where the power storage device is a secondary battery, the power storage device may be any of a lead-acid battery, a lithium-ion battery and a nickel-hydride battery, or may be a different type of battery from those batteries. The accessory electrical equipment is the equipment whose temperature changes as a result of charging of the power storage device, such as an AC/DC converter (or inverter) or a DC/DC converter. It should be noted that electric vehicle 1 may be a battery vehicle, a fuel cell vehicle or the like as long as electric vehicle 1 is equipped with power supply unit 30.

In the following description, a configuration where the power storage device is a secondary battery (that will also be referred to as simply a "battery" hereinafter) and includes a battery pack that is made up of a plurality of battery modules will be described.

Vehicle charging device 2 includes a charging station 3, a connector portion 4, an air-conditioned air carrying conduit 6, and an electric power supply line 8.

Connector portion 4 is configured to be capable of being coupled to electric vehicle 1, and is connected to charging station 3 via electric power supply line 8 and air-conditioned air carrying conduit 6. An external power supply supplied through electric power supply line 8 is provided to electric vehicle 1, and a heat medium supplied through air-conditioned air carrying conduit 6 is circulated within electric vehicle 1.

Air-conditioned air carrying conduit 6 includes an air-conditioned air supply conduit 6a and an air-conditioned air discharge conduit 6b, and is formed of a rubber tube or the like having flexibility so that connector portion 4 can be freely moved. Air-conditioned air supply conduit 6a has one end connected to connector portion 4 and the other end inserted into a building 70. An air conditioner 72 or the like is installed in building 70 to be air-conditioned to a prescribed comfort temperature (for example, 18° C. to 25° C.). Therefore, the air-conditioned air within building 70 (that will be referred to as simply "air-conditioned air" hereinafter) can be supplied to electric vehicle 1 as a heat medium through air-conditioned air supply conduit 6a. Air-conditioned air discharge conduit 6b has one end connected to connector portion 4 and the other end placed in the atmosphere outside building 70. Therefore, the air carried from electric vehicle 1 through air-conditioned air discharge conduit 6b is released outside building 70.

Electric power supply line 8 is an electric power line through which the external power supply for charging the battery mounted on electric vehicle 1 is supplied. Electric power supply line 8 has one end connected to connector portion 4 and the other end electrically connected to an electric power system 10. In other words, electric power supply line 8 electrically connects electric vehicle 1 to a system power supply supplied through electric power system 10. It should be noted that, instead of the system power supply, electric power generated by a solar cell panel installed on a roof or the like of building 70 may be supplied to electric vehicle 1. Electric power supply line 8 is also formed of a cab tire cable or the like having flexibility similarly to air-conditioned air carrying conduit 6.

Charging station 3 is installed in the proximity of both of a position where electric vehicle 1 is parked and building 70, and includes a take-up mechanism for air-conditioned air carrying conduit 6 and electric power supply line 8, a mechanism for housing connector portion 4 or the like (both of them are not shown). In addition, charging station 3 may include a security mechanism for a user, an accounting mechanism or the like.

Figure 2:
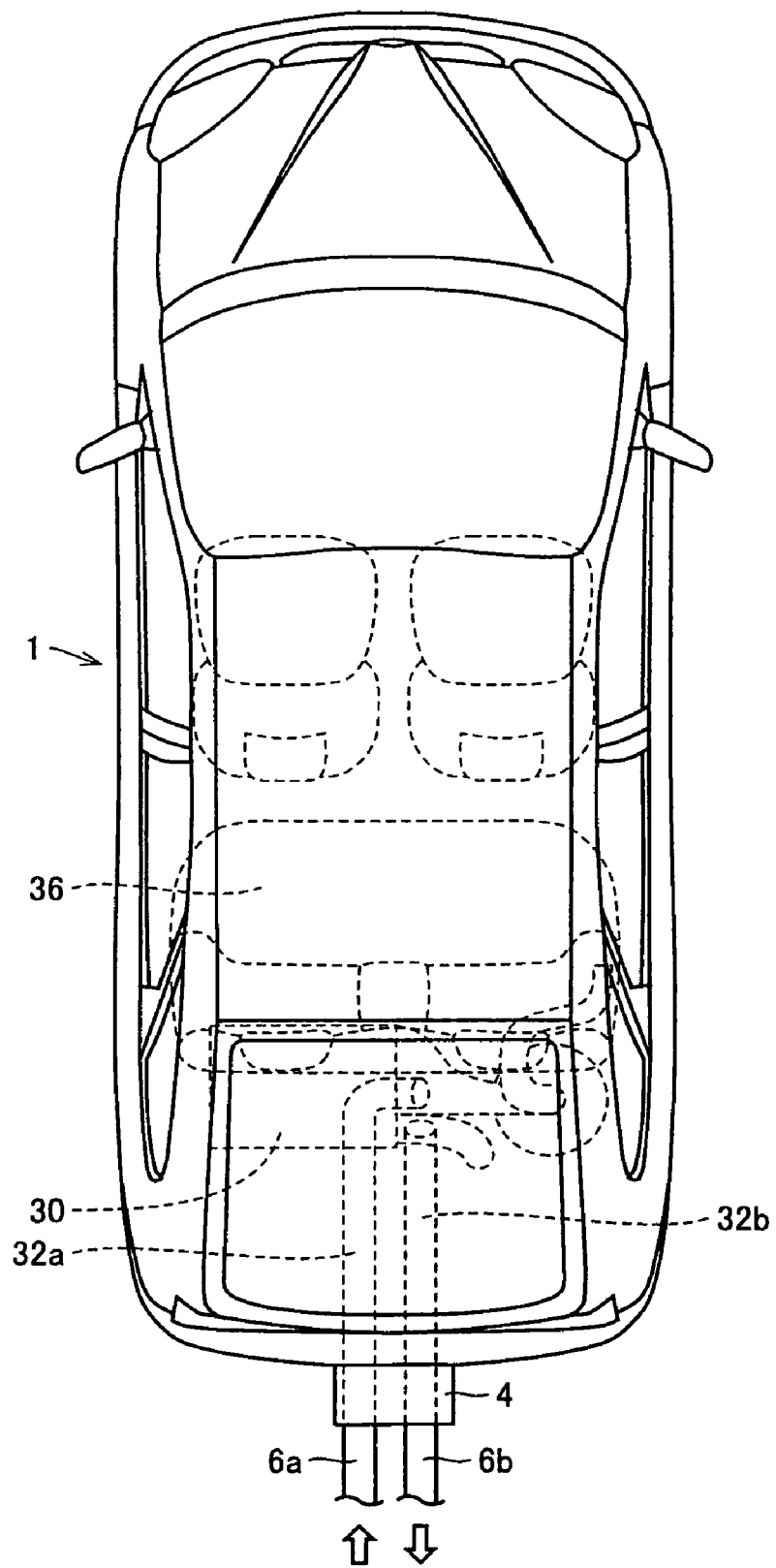
FIG. 2 is a top view of the electric vehicle in FIG. 1.

Referring to FIGS. 1 and 2, power supply unit 30 is located behind a rear seat 36 placed in a vehicle compartment space of electric vehicle 1 and above a luggage room floor. Placed in electric vehicle 1 is an outside air intake duct 32a through which the air-conditioned air supplied through air-conditioned air supply conduit 6a is guided to power supply unit 30 when connector portion 4 is coupled and the power storage device is charged by the external power supply.

Power supply unit 30 is configured to include a temperature change element whose temperature changes as a result of charging. An example of the temperature change element includes a battery, an AC/DC converter (or inverter), a DC/DC converter, or the like. In other words, in the battery, an endothermic or exothermic reaction occurs according to a change in entropy caused by a change in remaining battery charge, and a resistive heat generation by a charging current occurs. In the AC/DC converter or the DC/DC converter, heat is generated due to a switching loss of an IGBT (Insulated Gated Bipolar Transistor) or the like forming the AC/DC converter or the DC/DC converter. In order to suppress such temperature changes caused by charging and maintain the temperature change element at a prescribed temperature, the power storage device and the accessory electrical equipment are placed in power supply unit 30 so that heat exchange is performed between the air-conditioned air supplied through outside air intake duct 32a and the temperature change element.

In addition, placed in electric vehicle 1 is an outside air exhaust duct 32b through which the air-conditioned air after the heat exchange is performed with the power storage device and the accessory electrical equipment in power supply unit 30 is guided to air-conditioned air discharge conduit 6b.

In the present invention, causing the temperature change element to produce any of exothermic and endothermic reactions for its temperature change, that is, both of cooling control and warming control over the temperature change element are possible. Generally, however, the cooling control is required at the time of charging in many cases, and therefore, a configuration where a battery producing the exothermic reaction at the time of charging is regarded as the temperature change element and the battery is cooling-controlled will be mainly described in the following description.

Figure 3:
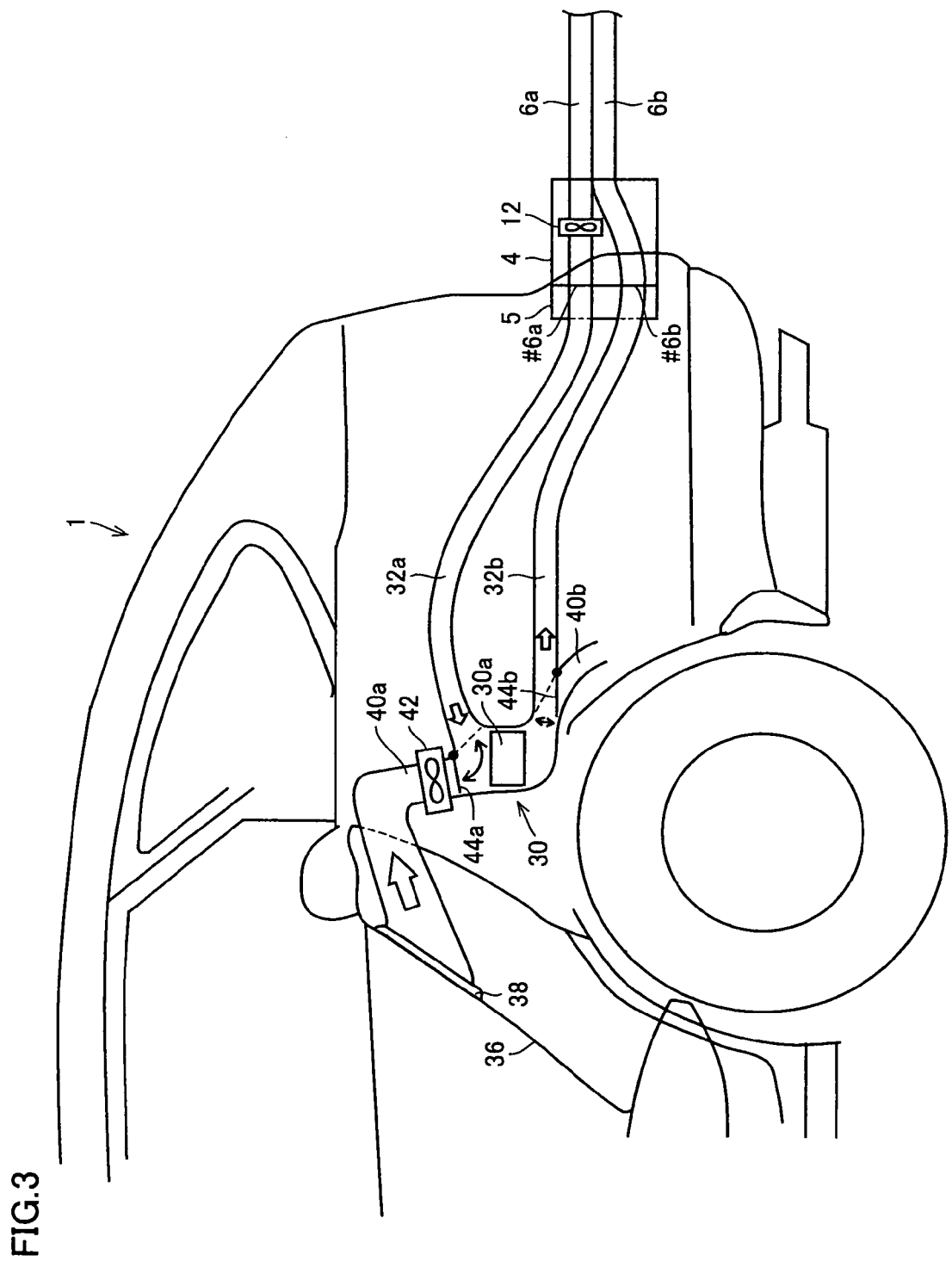
FIG. 3 is a diagram for illustrating a flow of the air-conditioned air supplied to the electric vehicle.

Referring to FIG. 3, a flow of the air-conditioned air supplied to electric vehicle 1 will be described. At the time of charging, connector portion 4 is coupled to a connector inserting portion 5 formed at electric vehicle 1. In a surface on the electric vehicle 1 side of connector portion 4, a supply opening #6a serving as one end of air-conditioned air supply conduit 6a and a discharge opening #6b serving as one end of air-conditioned air discharge conduit 6b are formed. Outside air intake duct 32a and outside air exhaust duct 32b are aligned with each other by connector inserting portion 5 so as to communicate with supply opening #6a and discharge opening #6b, respectively.

Placed in connector portion 4 is a blowing fan 12 by which the air-conditioned air supplied through air-conditioned air supply conduit 6a is circulated within electric vehicle 1. Blowing fan 12 is disposed at air-conditioned air supply conduit 6a, and compresses and delivers the air-conditioned air at a prescribed delivery pressure. By this blowing fan 12, the air-conditioned air supplied through air-conditioned air supply conduit 6a flows through outside air intake duct 32a, power supply unit 30, outside air exhaust duct 32b, and air-conditioned air discharge conduit 6b in turn. It should be noted that a suction fan may be disposed at outside air exhaust duct 32b instead of or in addition to the configuration where blowing fan 12 is disposed at air-conditioned air supply conduit 6a.

A battery 30a that is an example of the temperature change element is placed within power supply unit 30, and power supply unit 30 is configured such that the air-conditioned air supplied through outside air intake duct 32a flows in contact with a surface of battery 30a. In other words, battery 30a is placed such that heat exchange is performed between battery 30a and the air-conditioned air, and certain amount of heat generated as a result of charging is dissipated into the air-conditioned air.

Furthermore, provided at power supply unit 30 is a vehicle compartment air intake duct 40a through which the air in the vehicle compartment space (that will also be referred to as simply "vehicle compartment air" hereinafter) is taken in and delivered in order to cool battery 30a in a state where connector portion 4 is not coupled, such as while the vehicle is running, in other words, in a state where the air-conditioned air is not supplied from outside the vehicle. It should be noted that the vehicle compartment space mainly refers to a space where occupants stay and can be air-conditioned to a prescribed temperature while electric vehicle 1 is running.

Specifically, vehicle compartment air intake duct 40a is connected between an intake opening 38 that is placed in the side of rear seat 36 of electric vehicle 1 (an area having no contact with the back or shoulder of the occupant), and power supply unit 30. Vehicle compartment air intake duct 40a guides the vehicle compartment air drawn by a suction fan 42 to power supply unit 30.

In addition, provided at power supply unit 30 is a vehicle compartment air exhaust duct 40b through which the vehicle compartment air used for cooling of battery 30a is discharged to the luggage room. Vehicle compartment air intake duct 40a and vehicle compartment air exhaust duct 40b are connected to power supply unit 30 at a position in the proximity of outside air intake duct 32a and outside air exhaust duct 32b, respectively.

Moreover, provided at power supply unit 30 are switching dampers 44a and 44b serving as entry suppression mechanisms for suppressing entry of the air-conditioned air supplied through air-conditioned air supply conduit 6a into the vehicle compartment space. Switching damper 44a operates such that the inflow of air from any one of outside air intake duct 32a and vehicle compartment air intake duct 40a to power supply unit 30 is allowed, and switching damper 44b operates such that the inflow of air from power supply unit 30 to any one of outside air exhaust duct 32b and vehicle compartment air exhaust duct 40b is allowed.

Specifically, when connector portion 4 is coupled to electric vehicle 1, switching dampers 44a and 44b block vehicle compartment air intake duct 40a and vehicle compartment air exhaust duct 40b, respectively. Then, the air-conditioned air supplied from connector portion 4 through outside air intake duct 32a to power supply unit 30 cannot flow backward to vehicle compartment air intake duct 40a, and therefore, the air-conditioned air does not enter the vehicle compartment space. Furthermore, the air-conditioned air used for cooling of battery 30a does not flow through vehicle compartment air exhaust duct 40b, and therefore, the air-conditioned air does not enter the luggage room.

On the other hand, when connector portion 4 is disconnected, switching dampers 44a and 44b block outside air intake duct 32a and outside air exhaust duct 32b, respectively. Consequently, the vehicle compartment air drawn through vehicle compartment air intake duct 40a is not released outside the vehicle through outside air intake duct 32a or outside air exhaust duct 32b. Thus, battery 30a can be cooled efficiently by the vehicle compartment air while electric vehicle 1 is running, for example.

Figure 4:
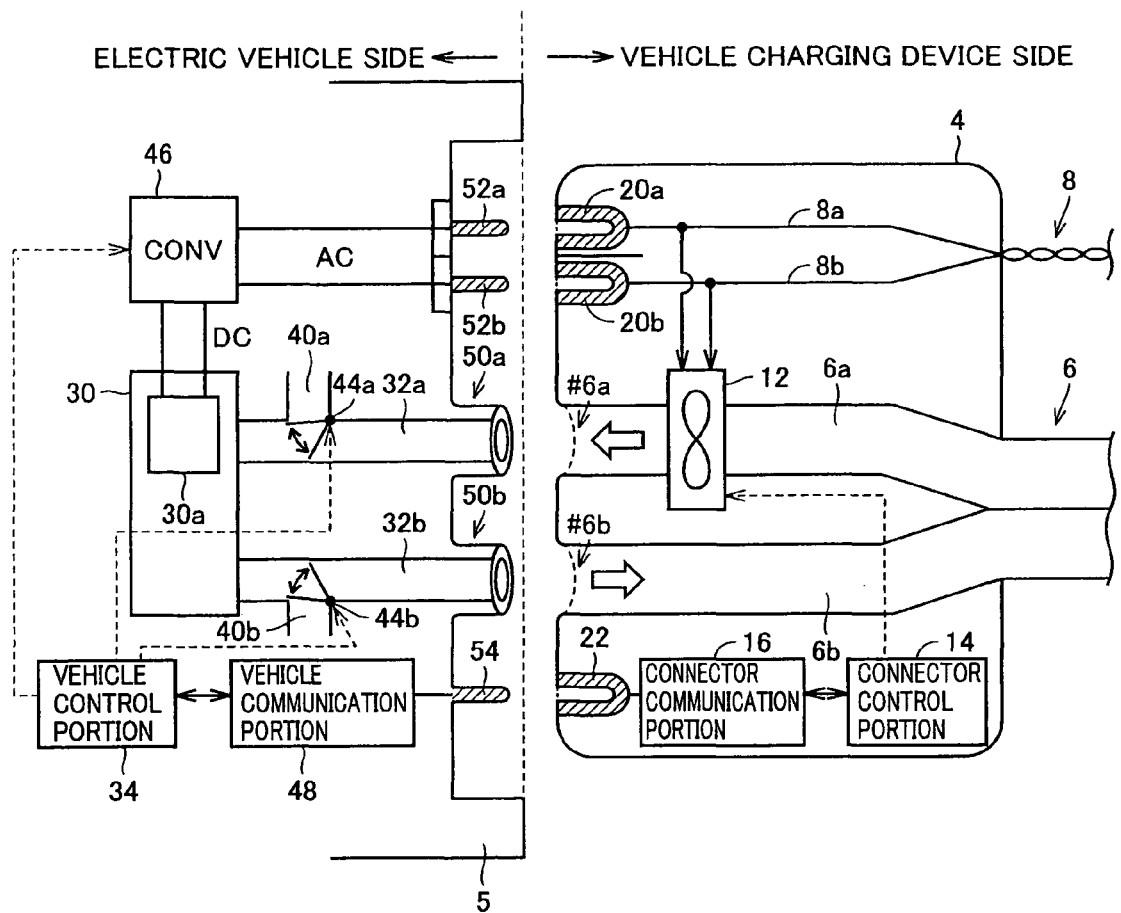
FIG. 4 is a schematic configuration diagram of a substantial portion of the vehicle charging system according to the embodiment of the present invention.

Referring to FIG. 4, connector portion 4 further includes a connector communication portion 16 and a connector control portion 14, and electric vehicle 1 further includes a converter (CONV) 46, a vehicle control portion 34 and a vehicle communication portion 48. Power supply electrodes 20a and 20b as well as a communication electrode 22 are formed at a coupled surface on the electric vehicle 1 side of connector portion 4 in addition to above-described supply opening #6a and discharge opening #6b. Power supply electrodes 20a and 20b are typically conductors in the shape of concave plugs, and are electrically connected to a p-side supply line 8a and an n-side supply line 8b that constitute electric power supply line 8, respectively. Communication electrode 22 is also typically a conductor in the shape of a concave plug, and is electrically connected to connector communication portion 16.

On the other hand, power supply inserting electrodes 52a and 52b, a supply inserting portion 50a, a discharge inserting portion 50b, and a communication inserting electrode 54 are formed at connector inserting portion 5 of electric vehicle 1. Power supply inserting electrodes 52a and 52b are typically conductors in the shape of convex plugs, and are coupled to power supply electrodes 20a and 20b of connector portion 4, respectively, to be electrically connected. Power supply inserting electrodes 52a and 52b provide the external power supply supplied from the connector portion 4 side to converter portion 46.

Supply inserting portion 50a is configured such that the outer surface thereof closely contacts the inner surface of supply opening #6a, and guides the air-conditioned air supplied from connector portion 4 to outside air intake duct 32a. Similarly, discharge inserting portion 50b is configured such that the outer surface thereof closely contacts the inner surface of discharge opening #6b, and guides the used air-conditioned air discharged from electric vehicle 1 to air-conditioned air discharge conduit 6b.

Furthermore, communication inserting electrode 54 is typically a conductor in the shape of a convex plug, and is coupled to communication electrode 22 of connector portion 4 to be electrically connected. Interactive communication is achieved between connector communication portion 16 and vehicle communication portion 48 via communication electrode 22 and communication inserting electrode 54.

First, each component of connector portion 4 will be described.

Blowing fan 12 is disposed at air-conditioned air supply conduit 6a and is supplied with driving electric power from p-side supply line 8a and n-side supply line 8b. Blowing fan 12 is activated or stopped according to a blowing command from connector control portion 14.

Upon receiving transmitted data from connector control portion 14, connector communication portion 16 transmits a modulated signal corresponding to the transmitted data to vehicle communication portion 48. On the other hand, upon receiving a modulated signal from vehicle communication portion 48, connector communication portion 16 demodulates the modulated signal to received data and outputs the received data to connector control portion 14.

Connector control portion 14 periodically delivers a prescribed status notification through connector communication portion 16 in order to detect the coupling between connector portion 4 and connector inserting portion 5. Since this data is transmitted to vehicle control portion 34 only when connector portion 4 is coupled to connector inserting portion 5, coupling or disconnection between connector portion 4 and connector inserting portion 5 can be determined on the electric vehicle 1 side based on whether the status notification is received or not. Upon receiving a notification that preparation for charging is completed from vehicle control portion 34 after connector portion 4 is coupled, connector control portion 14 provides an activation command to blowing fan 12 and supply of air-conditioned air to electric vehicle 1 is initiated.

Next, each component on the electric vehicle 1 side will be described.

Converter portion 46 converts the external power supply (AC electric power) supplied through power supply inserting electrodes 52a and 52b into DC electric power, and then supplies the DC electric power to battery 30a. It should be noted that converter portion 46 may be implemented by reversely operating an inverter that is capable of bidirectional conversion between AC and DC. It should be noted that converter portion 46 may be placed within power supply unit 30 and converter portion 46 may also be cooled in addition to battery 30a.

Both of switching dampers 44a and 44b carry out a switching operation in response to a switching command from vehicle control portion 34.

Upon receiving transmitted data from vehicle control portion 34, vehicle communication portion 48 transmits a modulated signal corresponding to the transmitted data to connector communication portion 16 of connector portion 4. On the other hand, upon receiving a modulated signal from connector communication portion 16, vehicle communication portion 48 demodulates the modulated signal to received data and outputs the received data to vehicle control portion 34.

Upon receiving a status notification from connector control portion 14, vehicle control portion 34 determines that connector portion 4 is coupled. Vehicle control portion 34 issues switching commands to switching dampers 44a and 44b, and performs a process of preparation for charging. In other words, vehicle control portion 34 actuates switching damper 44a such that switching damper 44a blocks vehicle compartment air intake duct 40a, and actuates switching damper 44b such that switching damper 44b blocks vehicle compartment air exhaust duct 40b. Thereafter, upon completion of the switching operation of switching dampers 44a and 44b, vehicle control portion 34 provides a notification that the preparation for charging is completed to connector control portion 14. Furthermore, upon initiation of supply of air-conditioned air through connector portion 4, connector control portion 14 provides an activation command to converter portion 46, and then charging of battery 30a is initiated.

When vehicle control portion 34 cannot receive a status notification from connector control portion 14 of the connector portion, vehicle control portion 34 determines that connector portion 4 is disconnected. Vehicle control portion 34 issues a switching notification to switching dampers 44a and 44b, and returns switching dampers 44a and 44b back to the original positions. In other words, vehicle control portion 34 actuates switching damper 44a such that switching damper 44a blocks outside air intake duct 32a, and actuates switching damper 44b such that switching damper 44b blocks outside air exhaust duct 32b.

Figure 5:
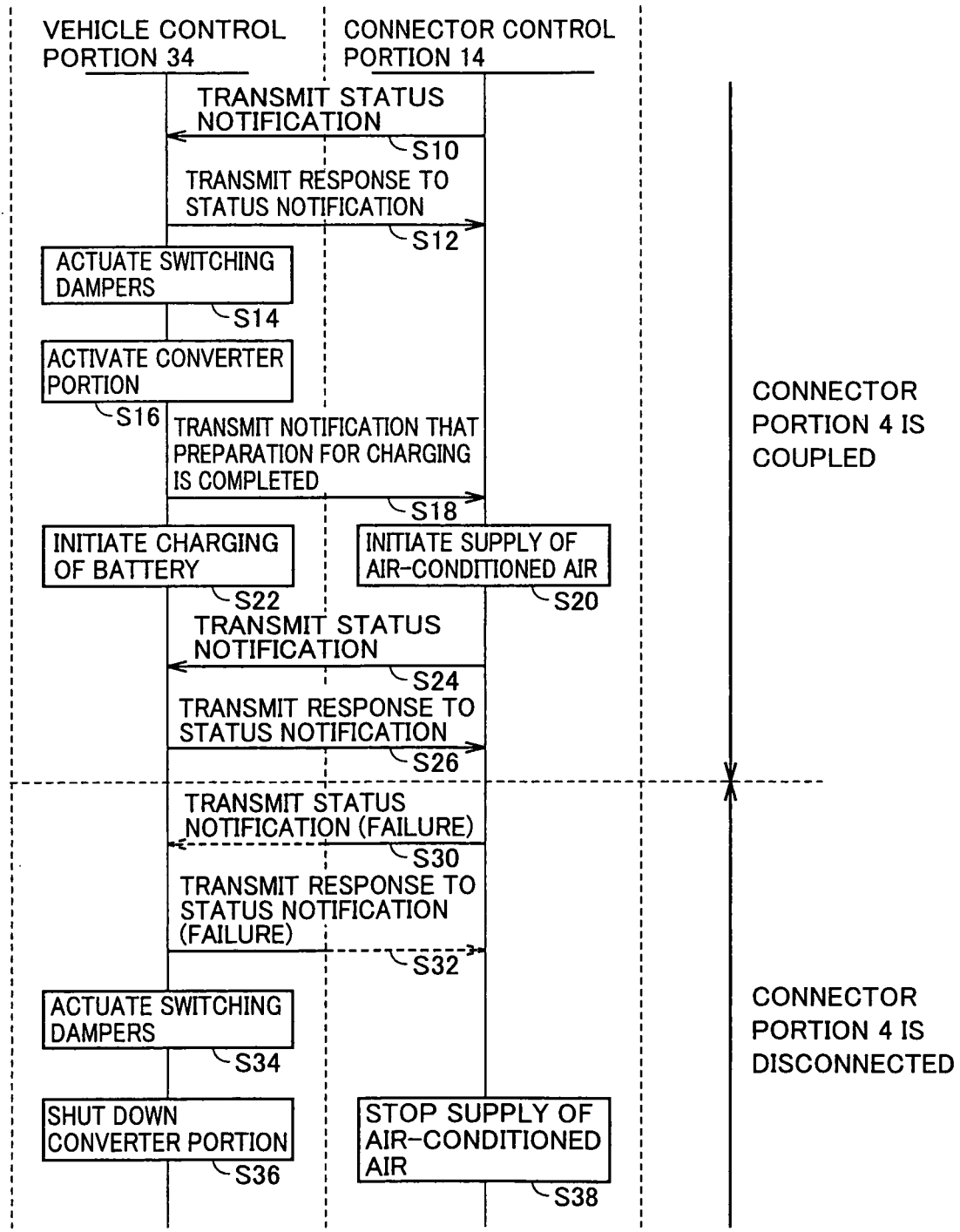
FIG. 5 is a sequence diagram related to charging of a battery.

Next, referring to FIG. 5, a sequence related to charging of battery 30a will be described. Connector control portion 14 periodically transmits a status notification to vehicle control portion 34 (step S10). When connector portion 4 is not coupled to connector inserting portion 5, vehicle control portion 34 cannot receive the status notification. Therefore, no process is performed. When connector control portion 14 does not receive a response from vehicle control portion 34 within a prescribed time, connector control portion 14 also waits until a next transmission cycle starts.

When connector portion 4 is coupled to connector inserting portion 5, vehicle control portion 34 receives the status notification and transmits a response to the status notification to connector control portion 14 (step S12). Then, vehicle control portion 34 provides switching commands to switching dampers 44a and 44b such that switching dampers 44a and 44b block vehicle compartment air intake duct 40a and vehicle compartment air exhaust duct 40b, respectively (step S14). Furthermore, vehicle control portion 34 provides a Ready command to converter portion 46 and activates converter portion 46 to a state where conversion is possible (a ready state) (step S16).

Upon completion of a process of preparation for charging as an example, vehicle control portion 34 transmits a notification that the preparation for charging is completed to connector control portion 14 (step S18). Upon receiving the notification that the preparation for charging is completed, vehicle control portion 34 provides a blowing command to blowing fan 12 and supply of air-conditioned air is initiated (step S20). On the other hand, vehicle control portion 34 provides an electric power conversion command to converter portion 46 and charging of battery 30a is initiated (step S22).

In the following, as long as connector portion 4 is being coupled to connector inserting portion 5, transmission of a status notification from connector control portion 14 to vehicle control portion 34 (step S24) and transmission of a response to the status notification from vehicle control portion 34 to connector control portion 14 (step S26) are periodically repeated.

Next, when connector portion 4 is disconnected from connector inserting portion 5, vehicle control portion 34 cannot receive a status notification from connector control portion 14 (step S30), and connector control portion 14 cannot receive a response to the status notification from vehicle control portion 34, either (step S32).

Then, vehicle control portion 34 determines that connector portion 4 is disconnected, and provides switching commands to switching dampers 44a and 44b such that switching dampers 44a and 44b block outside air intake duct 32a and outside air exhaust duct 32b, respectively (step S34). Furthermore, vehicle control portion 34 intercepts the Ready command to converter portion 46 and shuts down converter portion 46 (step S36).

On the other hand, connector control portion 14 intercepts the blowing command to blowing fan 12 and stops the supply of the air-conditioned air (step S38).

A process of charging battery 30a of electric vehicle 1 is performed according to the above-described sequence. Although a configuration for control by turning on or off blowing fan 12 is illustrated in the above-described sequence, the present invention may adopt a configuration wherein the number of revolutions (the volume of air) of blowing fan 12 is adjusted according to the temperature of battery 30a. In other words, a temperature detection portion is provided at battery 30a and the temperature of battery 30a detected by the temperature detection portion is transmitted from vehicle control portion 34 to connector control portion 14, so that the number of revolutions of blowing fan 12 can be controlled according to the temperature of battery 30a.

In the embodiment of the present invention, electric power supply line 8 corresponds to "electric power supply line," air-conditioned air supply conduit 6a corresponds to "heat medium supply conduit," air-conditioned air discharge conduit 6b corresponds to "heat medium discharge conduit," and blowing fan 12 corresponds to "circulation mechanism." Furthermore, outside air intake duct 32a and outside air exhaust duct 32b correspond to "heat medium path," vehicle compartment air intake duct 40a corresponds to "vehicle compartment air path," and a heat exchange mechanism 60 corresponds to "heat exchange mechanism."

According to the embodiment of the present invention, the heat medium (for example, the air-conditioned air) for temperature management (cooling control) of the battery that is an example of the temperature change element is supplied to electric vehicle 1 in addition to the external power supply for charging the battery. Furthermore, the air-conditioned air used for cooling of the battery is discharged outside the vehicle through air-conditioned air discharge conduit 6b. Therefore, retention of the used air-conditioned air in the vehicle compartment space can be avoided. As a result, the passenger comfort is ensured and the battery can be charged by the external power supply while temperature changes of the battery caused by charging are suppressed.

In addition, according to the present invention, since the supply electrodes for the external power supply as well as the supply opening and the discharge opening for the heat medium (for example, the air-conditioned air) are formed in the same connector portion, the user can achieve charging of the battery by coupling the single connector portion to the electric vehicle. Therefore, a user-friendly vehicle charging system can be provided.

Moreover, according to the present invention, since the air-conditioned air within the building is used for temperature management of the temperature change element such as the battery, a special air-conditioning device is not required. Therefore, there can be provided a vehicle charging system that can be implemented at relatively low costs.

[Modification]

Although a configuration where the air-conditioned air from the air-conditioned building is used as the heat medium is illustrated in the above-described embodiment of the present invention, other heat medium may be used together in order to further improve a temperature management capability. By way of example, a configuration where a liquid medium (for example, water) is used together in addition to the air-conditioned air is illustrated in a modification of the embodiment of the present invention.

Figure 6:
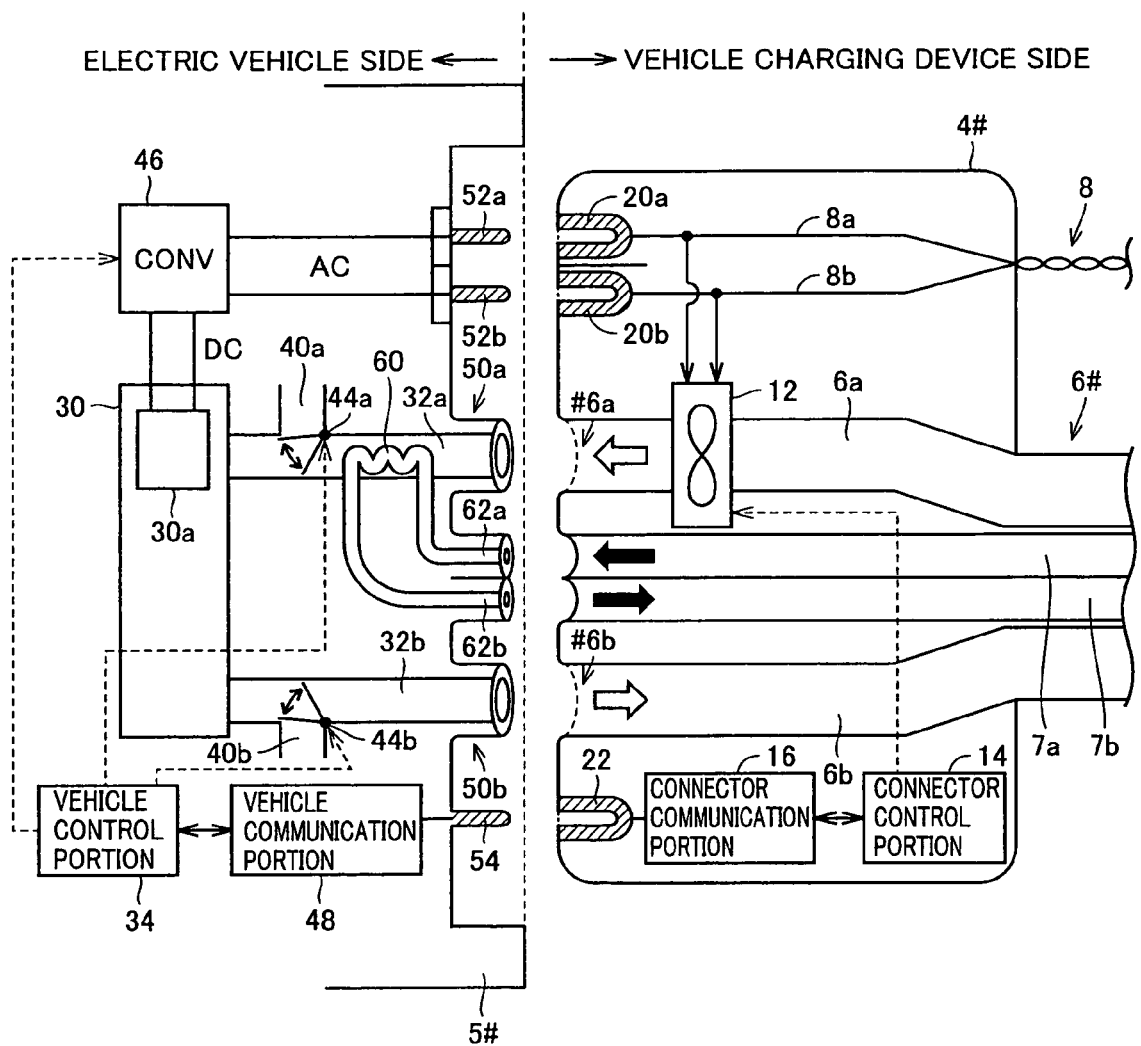
FIG. 6 is a schematic configuration diagram of a substantial portion of a vehicle charging system according to a modification of the embodiment of the present invention.

Referring to FIG. 6, in a vehicle charging system according to the modification of the embodiment of the present invention, a heat medium carrying conduit 6# further including a water supply conduit 7a and a water discharge conduit 7b is employed instead of air-conditioned air carrying conduit 6 in the vehicle charging system according to the embodiment of the present invention shown in FIG. 4, and heat exchange mechanism 60 is further placed in electric vehicle 1.

Water supply conduit 7a is coupled to water piping or the like (that is not shown) in building 70 and is supplied with water that is a typical example of the liquid medium. Since the temperature of tap water shows relatively gradual changes throughout the year, a liquid medium (water) having a temperature within a prescribed temperature range is obtained.

Provided on the electric vehicle 1 side are supply inserting portion 50a and discharge inserting portion 50b configured to closely contact the inner surfaces of water supply conduit 7a and water discharge conduit 7b, respectively. Heat exchange mechanism 60 placed within outside air intake duct 32a causes heat exchange to be performed between water supplied through water supply conduit 7a and the air-conditioned air supplied through air-conditioned air supply conduit 6a. In other words, before the air-conditioned air is used for cooling of battery 30a, heat exchange mechanism 60 cools the air-conditioned air by the supplied water. With the above-described heat exchange mechanism 60, even if the temperature of the air-conditioned air rises in a process of being carried through air-conditioned air carrying conduit 6, air-conditioned air having lower temperature can be supplied to battery 30a.

Since the configuration is otherwise the same as that in the above-described embodiment of the present invention, the detailed description thereof will not be repeated.

According to the modification of the embodiment of the present invention, in addition to the effect obtained according to the embodiment of the present invention, the temperature management capability for the temperature change element can be improved.

Although a configuration where only the battery is cooled is illustrated in the above-described embodiment of the present invention and the modification thereof, the present invention may be configured such that the accessory electrical equipment such as the converter portion is also cooled. In other words, converter portion 46 shown in FIG. 4 or 6 is placed within power supply unit 30 together with battery 30a, so that both of converter portion 46 and battery 30a can be cooled.

Furthermore, although a configuration where gas is used as the heat medium is illustrated in the above-described embodiment of the present invention, liquid may be used as the heat medium instead of the gas. Preferably, the heat exchange mechanism and the like can be shared by using the same type of heat medium as that used for thermal management while the vehicle is running, and therefore, the overall configuration can be simplified.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A vehicle charging system, comprising:
an electric vehicle equipped with a power storage device that is configured to be rechargeable; and
a vehicle charging device for charging said power storage device mounted on said electric vehicle by an external power supply,
said vehicle charging device including
a connector portion coupled to said electric vehicle at the time of charging,
an electric power supply line by which said external power supply and said electric vehicle are electrically connected through said connector portion at the time of charging,
a heat medium supply conduit through which a heat medium is supplied from outside the vehicle through said connector portion to said electric vehicle, the heat medium is used to maintain, at a prescribed temperature, a temperature change element whose temperature changes as a result of charging of said power storage device at the time of charging, and
a heat medium discharge conduit through which said heat medium having been used to maintain a temperature of said temperature change element in said electric vehicle at the time of charging is discharged outside the vehicle through said connector portion,
said heat medium supply conduit being provided with air-conditioned air within an air-conditioned building as said heat medium, and
said heat medium discharge conduit being configured such that said heat medium discharged from said electric vehicle is released outside said building.

2. The vehicle charging system according to claim 1, wherein
said connector portion includes a circulation mechanism for circulating said heat medium supplied through said heat medium supply conduit within said electric vehicle.

3. The vehicle charging system according to claim 1, wherein
said electric vehicle includes a heat medium path formed to be separated from a vehicle compartment space and configured such that said heat medium supplied through said heat medium supply conduit is guided to said heat medium discharge conduit, and said temperature change element is placed in said heat medium path such that heat exchange is performed between said heat medium and said temperature change element.

4. The vehicle charging system according to claim 1, wherein
said electric vehicle further includes
a vehicle compartment air path configured to communicate with said heat medium path, for taking in and delivering vehicle compartment air to said temperature change element, and
an entry suppression mechanism for suppressing entry of said heat medium supplied through said heat medium path into said vehicle compartment space through the vehicle compartment air path.

5. The vehicle charging system according to claim 1, wherein
said heat medium supply conduit is configured such that a liquid medium having a prescribed temperature is further supplied as said heat medium in addition to said air-conditioned air, and
said electric vehicle further includes a heat exchange mechanism by which heat exchange is performed between said air-conditioned air and said liquid medium before said air-conditioned air is used to maintain a temperature of said temperature change element.

6. A vehicle charging device for charging a power storage device, mounted on an electric vehicle and configured to be rechargeable, by an external power supply, comprising:
a connector portion coupled to said electric vehicle at the time of charging;
an electric power supply line by which said external power supply and said electric vehicle are electrically connected through said connector portion at the time of charging;
a heat medium supply conduit through which a heat medium is supplied through said connector portion to said electric vehicle, the heat medium is used to maintain, at a prescribed temperature, a temperature change element whose temperature changes as a result of charging of said power storage device at the time of charging; and
a heat medium discharge conduit through which said heat medium having been used to maintain a temperature of said temperature change element in said electric vehicle at the time of charging is discharged outside the vehicle through said connector portion,
said heat medium supply conduit being provided with air-conditioned air within an air-conditioned building as said heat medium, and
said heat medium discharge conduit being configured such that said heat medium discharged from said electric vehicle is released outside said building.

7. The vehicle charging device according to claim 6, wherein
said connector portion includes a circulation mechanism for circulating said heat medium supplied through said heat medium supply conduit within said electric vehicle.

8. An electric vehicle equipped with a power storage device that is configured to be rechargeable, and configured such that said power storage device can be charged by an external power supply,
said electric vehicle being configured to be capable of being coupled to a connector portion through which said external power supply is supplied at the time of charging,
said connector portion having a supply opening through which air-conditioned air within an air-conditioned building is supplied to said electric vehicle at the time of charging as a heat medium and a discharge opening through which said heat medium discharged from said electric vehicle is released outside said building at the time of charging is received formed in a coupled surface with said electric vehicle,
said electric vehicle including a heat medium path formed to be separated from a vehicle compartment space and configured such that said heat medium supplied from said supply opening of said connector portion is guided to said discharge opening of said connector portion, and
a temperature change element being placed in said heat medium path such that heat exchange is performed between said heat medium and said temperature change element whose temperature changes as a result of charging of said power storage device at the time of charging.

9. The electric vehicle according to claim 8, further comprising:
a vehicle compartment air path configured to communicate with said heat medium path, for taking in and delivering vehicle compartment air to said temperature change element; and
an entry suppression mechanism for suppressing entry of said heat medium supplied through said heat medium path into said vehicle compartment space through the vehicle compartment air path.

\* \* \* \* \*